United States Patent
Stewart

(10) Patent No.: US 7,666,510 B2
(45) Date of Patent: Feb. 23, 2010

(54) OPTICAL ELEMENTS THAT INCLUDE CURABLE FILM-FORMING COMPOSITIONS CONTAINING BLOCKED ISOCYANATE ADHESION PROMOTERS

(75) Inventor: Kevin J. Stewart, Murrysville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 877 days.

(21) Appl. No.: 11/221,188

(22) Filed: Sep. 7, 2005

(65) Prior Publication Data
US 2007/0054131 A1     Mar. 8, 2007

(51) Int. Cl.
*B32B 27/40*     (2006.01)
(52) U.S. Cl. .................. 428/423.1; 428/425.6
(58) Field of Classification Search ............ 428/423.1, 428/425.6
See application file for complete search history.

(56) References Cited

U.S. PATENT DOCUMENTS

| | | | |
|---|---|---|---|
| 5,316,791 A | 5/1994 | Farber et al. | |
| 5,595,789 A | 1/1997 | Bier | |
| 6,387,519 B1 * | 5/2002 | Anderson et al. | 428/447 |
| 7,410,691 B2 * | 8/2008 | Blackburn et al. | 428/334 |
| 7,465,415 B2 * | 12/2008 | Wang et al. | 252/586 |
| 2004/0096666 A1 | 5/2004 | Knox et al. | |
| 2004/0207809 A1 | 10/2004 | Blackburn et al. | |
| 2005/0090635 A1 | 4/2005 | Hommmes et al. | |

FOREIGN PATENT DOCUMENTS

| | | |
|---|---|---|
| DE | 103 26 538 A1 | 5/2005 |
| EP | 0 343 523 | 11/1989 |
| EP | 0 764 857 A1 | 3/1997 |
| EP | 1 036 827 A2 | 9/2000 |
| EP | 1 137 731 A1 | 4/2001 |
| WO | WO 03/016367 A1 | 2/2003 |

\* cited by examiner

*Primary Examiner*—Thao T. Tran
(74) *Attorney, Agent, or Firm*—Linda Pingitore; Deborah M. Altman

(57) ABSTRACT

Described are optical elements made of a substrate and a curable film-forming composition applied to at least a portion of the substrate to form a coating thereon. The curable film-forming composition comprises:
  i) a resinous material comprising a monomer, oligomer, and/or polymer containing reactive functional groups;
  ii) a curing agent having two or more reactive functional groups that are reactive with functional groups in the resinous material of i); and
  iii) a material different from i) and ii), comprising a blocked isocyanate group blocked with a blocking agent capable of deblocking at a low temperature. The material of iii) is present in the curable film-forming composition at least in an amount sufficient to improve adhesion between the curable film-forming composition and the substrate and/or a superposed coating compared to a substantially identical optical element that does not comprise the material of iii) in the curable film-forming composition.

21 Claims, No Drawings

OPTICAL ELEMENTS THAT INCLUDE CURABLE FILM-FORMING COMPOSITIONS CONTAINING BLOCKED ISOCYANATE ADHESION PROMOTERS

FIELD OF THE INVENTION

The present invention relates to optical elements comprising substrates coated with curable film-forming compositions containing blocked isocyanate adhesion promoters.

BACKGROUND OF THE INVENTION

Optical elements that provide acceptable imaging qualities while maintaining durability and abrasion resistance are sought for a variety of applications, such as windshields, sunglasses, fashion lenses, non-prescription and prescription lenses, sport masks, face shields and goggles. Responsive to that need, coated optical elements have been developed.

However, often the coatings lack sufficient adhesion to a substrate to provide long wear. Coatings such as photochromic coatings and protective tie-layer coatings have been developed containing adhesion promoters such as epoxides and aminoalkyltrialkoxysilanes to enhance adhesion of coatings to the substrate and/or to subsequently applied coatings. However, such adhesion promoters have highly reactive functional groups that may lead to instability and reduced shelf life of coating compositions. Blocked isocyanates have also been used, but when the deblocking temperature of the blocking agent exceeds the curing temperature of the resinous components, the adhesion promoters may not be as effective as necessary.

There is a need in the art to develop optical articles containing coating compositions with adhesion promoters that will be effective at improving adhesion at or below curing temperatures, yet will not interfere with composition shelf life.

SUMMARY OF THE INVENTION

In accordance with the present invention, an optical article adapted to possess a light influencing property is provided, comprising:
a) a substrate; and
b) a curable film-forming composition applied to at least a portion of the substrate to form a coating thereon. The curable film-forming composition comprises:
  i) a resinous material comprising a monomer, oligomer, and/or polymer containing reactive functional groups;
  ii) a curing agent having two or more reactive functional groups that are reactive with functional groups in the resinous material of i); and
  iii) a material different from i) and ii), comprising a blocked isocyanate group and another different functional group capable of reacting with functional groups on the resinous material of i), functional groups on the curing agent of ii), functional groups on a superposed coating, and/or functional groups on the substrate. In one embodiment, the isocyanate group is blocked with a blocking agent capable of deblocking at a temperature as low as 100° C. Alternatively, the blocking agent is capable of deblocking at or below a temperature at which any of the functional groups on the material of iii), functional groups on the resinous material of i), functional groups on the curing agent of ii), functional groups on a superposed coating, and/or functional groups on the substrate react w/each other. The material of iii) is present in the curable film-forming composition at least in an amount sufficient to improve adhesion between the curable film-forming composition and the substrate and/or a superposed coating compared to a substantially identical optical element that does not comprise the material of iii) in the curable film-forming composition.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are each understood to be non-limiting with respect to the scope of the invention.

As used in the following description and claims, the following terms have the indicated meanings:

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_5$ substituted acrylic acids, such as methacrylic acid, ethacrylic acid, etc., and their $C_1$-$C_5$ alkyl esters, unless clearly indicated otherwise. The terms "(meth) acrylic" or "(meth)acrylate" are intended to cover both the acrylic/acrylate and methacrylic/methacrylate forms of the indicated material, e.g., a (meth)acrylate monomer.

The term "cure", "cured" or similar terms, as used in connection with a cured or curable composition, e.g., a "cured composition" of some specific description, means that at least a portion of the polymerizable and/or crosslinkable components that form the curable composition is at least partially polymerized and/or crosslinked. In one embodiment, the degree of crosslinking, can range from 5% to 100% of complete crosslinking. In alternate embodiments, the degree of crosslinking can range from 35% to 85%, e.g., 50% to 85%, of full crosslinking. The degree of crosslinking can range between any combination of the previously stated values, inclusive of the recited values.

The term "curable", as used for example in connection with a curable film-forming composition, means that the indicated composition is polymerizable or cross linkable, e.g., by means that include, but are not limited to, thermal, catalytic, electron beam, chemical free-radical initiation, and/or photoinitiation such as by exposure to ultraviolet light or other actinic radiation.

The term "light influencing function", "light influencing property" or terms of like import means that the indicated material, e.g., coating, film, substrate, etc., is capable of modifying by absorption (or filtering) of incident light radiation, e.g., visible, ultraviolet (UV) and/or infrared (IR) radiation that impinges on the material. In alternate embodiments, the light influencing function can be light polarization, e.g., by means of a polarizer and/or dichroic dye; a change in light absorption properties, e.g., by use of a chromophore that changes color upon exposure to actinic radiation, such as a photochromic material; transmission of only a portion of the incident light radiation, e.g., by use of a fixed tint such as a conventional dye; or by a combination of one or more of such light influencing functions.

The term "adapted to possess at least one light influencing property", as used for example in connection with a rigid optical substrate, means that the specified item is capable of having the light influencing property incorporated into or appended to it. For example, a plastic matrix that is adapted to possess a light influencing property means that the plastic matrix has sufficient internal free volume to accommodate internally a photochromic dye or tint. The surface of such a plastic matrix may alternatively be capable of having a photochromic or tinted layer, film or coating appended to it, and/or is capable of having a polarizing film appended to it.

The terms "on", "appended to", "affixed to", "bonded to", "adhered to", or terms of like import means that the designated item, e.g., a coating, film or layer, is either directly connected to (superimposed on) the object surface, or indirectly connected to the object surface, e.g., through one or more other coatings, films or layers (superposed on).

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate, means that the specified item is self-supporting.

The term "optical substrate" means that the specified substrate exhibits a light transmission value (transmits incident light) of at least 4 percent and exhibits a haze value of less than 1 percent, e.g., less than 0.5 percent, when measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "photochromic receptive" means that the indicated item has sufficient free volume to permit photochromic material(s) incorporated within it to transform from its colorless form to its colored form (and then revert to its colorless form) to the degree required for commercial optical applications.

The term "tinted", as used for example in connection with ophthalmic elements and optical substrates, means that the indicated item contains a fixed light radiation absorbing agent, such as but not limited to, conventional coloring dyes, infrared and/or ultraviolet light absorbing materials on or in the indicated item. The tinted item has an absorption spectrum for visible radiation that does not vary significantly in response to actinic radiation.

The term "non-tinted", as used for example in connection with ophthalmic elements and optical substrates, means that that the indicated item is substantially free of fixed light radiation absorbing agents. The non-tinted item has an absorption spectrum for visible radiation that does not vary significantly in response to actinic radiation.

The term "actinic radiation" includes light with wavelengths of electromagnetic radiation ranging from the ultraviolet ("UV") light range, through the visible light range, and into the infrared range. Actinic radiation which can be used to cure coating compositions used in the present invention generally has wavelengths of electromagnetic radiation ranging from 150 to 2,000 nanometers (nm), from 180 to 1,000 nm, or from 200 to 500 nm. In one embodiment, ultraviolet radiation having a wavelength ranging from 10 to 390 nm can be used. Examples of suitable ultraviolet light sources include mercury arcs, carbon arcs, low, medium or high pressure mercury lamps, swirl-flow plasma arcs and ultraviolet light emitting diodes. Suitable ultraviolet light-emitting lamps are medium pressure mercury vapor lamps having outputs ranging from 200 to 600 watts per inch (79 to 237 watts per centimeter) across the length of the lamp tube.

The term "tinted photochromic", as used for example in connection with ophthalmic elements and optical substrates, means that the indicated item contains a fixed light absorbing agent and a photochromic material. The indicated item has an absorption spectrum for visible radiation that varies in response to actinic radiation and is thermally reversible when the actinic radiation is removed. For example, the tinted photochromic item may have a first characteristic of the light absorbing agent, e.g., a coloring tint, and a second color characteristic of the combination of the light absorbing agent and the activated photochromic material when the photochromic material is exposed to actinic radiation.

The term "dichroic material", "dichroic dye" or terms of like import means a material/dye that absorbs one of two orthogonal plane-polarized components of transmitted radiation more strongly than the other. Non-limiting examples of dichroic materials include indigoids, thioindigoids, merocyanines, indans, azo and poly(azo) dyes, benzoquinones, naphthoquinones, anthraquinones, (poly)anthraquinones, anthrapyrimidinones, iodine and iodates. The term "dichroic" is synonymous with "polarizing" or words of like import.

The term "dichroic photochromic" means a specified material or article that exhibits both dichroic and photochromic properties. In alternate non-limiting embodiments, the specified material can include both photochromic dyes/compounds and dichroic dyes/compounds, or single dyes/compounds that possess both photochromic and dichroic properties.

The term "transparent", as used for example in connection with a substrate, film, material and/or coating, means that the indicated substrate, coating, film and/or material has the property of transmitting light without appreciable scattering so that objects lying beyond are entirely visible.

The phrase "an at least partial film" means an amount of film covering at least a portion, up to the complete surface of the substrate. As used herein, a "film" may be formed by a sheeting type of material or a coating type of material. For example, a film may be an at least partially cured polymeric sheet or an at least partially cured polymeric coating of the material indicated. The phrase "at least partially cured"

means a material in which from some to all of the curable or cross-linkable components are cured, crosslinked and/or reacted.

The term "photochromic amount" means that a sufficient amount of photochromic material is used to produce a photochromic effect discernible to the naked eye upon activation. The particular amount used depends often upon the intensity of color desired upon irradiation thereof and upon the method used to incorporate the photochromic materials. Typically, in another non-limiting embodiment, the more photochromic incorporated, the greater is the color intensity up to a certain limit. There is a point after which the addition of any more material will not have a noticeable effect, although more material can be added, if desired.

The term "superposed" describes a coating applied on top of or subsequent to the curable film-forming composition of b), such that at least a portion of the curable film-forming composition of b) lies between the substrate and the superposed coating.

According to the present invention, an optical element adapted to possess a light influencing property is provided, comprising:
 a) a substrate; and
 b) a curable film-forming composition applied to at least a portion of the substrate to form a coating thereon. The curable film-forming composition in turn comprises:
 i) a resinous material comprising a monomer, oligomer, and/or polymer containing reactive functional groups;
 ii) a curing agent having two or more reactive functional groups that are reactive with functional groups in the resinous material of i); and
 iii) a material different from i) and ii), comprising a blocked isocyanate group and another different functional group capable of reacting with functional groups on the resinous material of i), functional groups on the curing agent of ii), functional groups on a superposed coating, and/or functional groups on the substrate. The isocyanate group is blocked with a blocking agent. In one embodiment, the blocking agent is capable of deblocking at a temperature as low as 100° C. In a separate embodiment, often when the curable film-forming composition is thermally curable, the blocking agent is capable of deblocking at or below a temperature at which any of the functional groups on the material of iii), functional groups on the resinous material of i), functional groups on the curing agent of ii), functional groups on a superposed coating, and/or functional groups on the substrate react w/each other. Additionally, the material of iii) is present in the curable film-forming composition at least in an amount sufficient to improve adhesion between the curable film-forming composition and the substrate and/or a superposed coating compared to a substantially identical optical element that does not contain the material of iii) in the curable film-forming composition.

Optical elements of the present invention include ophthalmic articles such as piano (without optical power) and vision correcting (prescription) lenses (finished and semifinished) including multifocal lenses (bifocal, trifocal, and progressive lenses); and ocular devices such as contact lenses and intraocular lenses, sun lenses, fashion lenses, sport masks, face shields and goggles. The optical element may also be chosen from glazings such as windows and vehicular transparencies such as automobile windshields and side windows.

The optical elements of the present invention are adapted to possess a light influencing property. Such properties may be of more than one type and may be imparted to any of the components of the optical element, including the substrate, the curable film-forming composition, and/or any superposed coatings.

The substrate a) used in the present invention comprises an optical substrate and may be chosen from, inter alia, mineral glass, ceramic, solgel, and polymeric organic materials. The substrate may be rigid, i. e., capable of maintaining its shape and supporting the applied curable film-forming composition. The optical substrate, including any coatings or treatments applied thereto, may be adapted to possess a light influencing property as discussed above. The light influencing property may be of more than one type and may be integral to (i. e., incorporated into) the substrate, for example, by imbibition or casting of a light influencing compound into the substrate matrix, or a light influencing compound may be contained in a coating or treatment applied to a surface of the substrate. In a particular embodiment of the present invention the substrate is a polymeric organic material such as an optically clear polymerizate, e.g., material suitable for optical applications, such as ophthalmic articles. Such optically clear polymerizates have a refractive index that may vary widely. Examples include polymerizates of optical resins such as thermoplastic polycarbonate and optical resins sold by PPG Industries, Inc. as TRIVEX® monomer composition and under the CR-designation, e.g., CR-39® monomer composition. High refractive index polythiourethane substrates available from Mitsui Chemicals Co., Ltd., under the names MR-6, MR-7, MR-8, and MR-10 are also suitable. Non-limiting examples of other suitable substrates are disclosed in U.S. Patent Publication 2004/0096666 in paragraphs [0061] and [0064] to [0081], incorporated herein by reference.

The substrate used in the optical article of the present invention may comprise polymeric organic material chosen from thermoplastic material, thermosetting material and mixtures thereof. Such materials are described in the *Kirk-Othmer Encyclopedia of Chemical Technology*, Fourth Edition, Volume 6, pages 669 to 760. Thermoplastic materials can be made substantially thermoplastic or thermosetting by the appropriate chemical modification, as known to those skilled in the art.

Further examples of optical resins that may be used as substrates in the present invention include the resins used to form hard and soft contact lenses such as are disclosed in U.S. Pat. No. 5,166,345, column 11, line 52, to column 12, line 52, soft contact lenses with high moisture content as described in U.S. Pat. No. 5,965,630 and extended wear contact lenses as described in U.S. Pat. No. 5,965,631, which disclosures related to optical resins for contact lenses are incorporated herein by reference.

In certain embodiments, the substrate may include a coating or film on the surface thereof, wherein the coating or film imparts a light influencing property and/or provides protection to the substrate from abrasion or other damage. Examples of suitable abrasion resistant coatings include those disclosed in published U.S. patent application No. 2004/0207809, paragraphs [0205]-[0249], incorporated herein by reference. Suitable coatings designed to provide impact resistance include those disclosed in U.S. Pat. No. 5,316,791, col. 3, line 7-col. 7, line 35, incorporated herein by reference. Other suitable coatings and films are discussed in more detail below.

The curable film-forming composition of b) may be cured using any known means, such as thermally or by actinic radiation. The film-forming composition comprises:
 i) a resinous material comprising a monomer, oligomer, and/or polymer containing reactive functional groups;

ii) a curing agent having two or more reactive functional groups that are reactive with functional groups in the resinous material of i); and iii) a material different from i) and ii), comprising a blocked isocyanate group and at least one other different functional group capable of reacting with functional groups on the resinous material of i), functional groups on the curing agent of ii), functional groups on a superposed coating, and/or functional groups on the substrate. The curable film-forming composition used in the optical element of the present invention may be in any physical form, most often solventborne or waterborne.

The resinous material of i) may comprise one or more monomers, wherein at least one monomer contains reactive functional groups. Suitable monomers include ethylenically unsaturated monomers, for example, vinyl monomers and/or (meth)acrylic monomers; i.e., monomers of acrylic or methacrylic acid or esters thereof, such as aliphatic alkyl esters containing from 1 to 30, and often 4 to 18 carbon atoms in the alkyl group. Suitable esters include methyl(meth)acrylate, ethyl(meth)acrylate, isopropyl(meth)acrylate, n-butyl(meth)acrylate, isobutyl(meth)acrylate, 2-ethylhexyl(meth)acrylate, 2-hydroxyethyl(meth)acrylate, glycidyl(meth)acrylate, diethylene glycol(meth)acrylate, 2,2-dimethyl-3-hydroxypropyl-2,2-dimethyl-3-hydroxypropionate, isobornyl (meth)acrylate, tetrahydrofurfuryl(meth)acrylate, (meth)acrylates derived from aromatic glycidyl ethers such as bisphenol A diglycidyl ethers and aliphatic diglycidyl ethers, and styrene-type monovinyl aromatic compounds such as styrene, methylstyrene, ethyl styrene and chlorostyrene.

Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. N-(alkoxymethyl)acrylamides and N-(alkoxymethyl)methacrylamides are also suitable.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are preferred. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 8 to 30 carbon atoms, such as butyl glycidyl ether, octyl glycidyl ether, phenyl glycidyl ether and para-(tertiary butyl) phenyl glycidyl ether. Commonly used glycidyl esters include those of the structure:

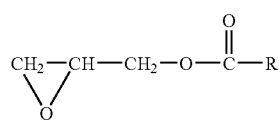

where R is a hydrocarbon radical containing from about 4 to about 26 carbon atoms. Often, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional monomers, such as a carbamate functional alkyl ester of (meth)acrylic acid, may be used. Other useful carbamate functional monomers are disclosed in U.S. Pat. No. 5,098,947, which is incorporated herein by reference. Other useful carbamate functional monomers are disclosed in U.S. Pat. No. 5,098,947, which is incorporated herein by reference.

Amide functional monomers are suitable for use as the resinous material i). Likewise, other functional groups may be incorporated as desired using suitably functional monomers if available or conversion reactions as necessary.

Actinic radiation-curable compositions generally contain at least one free radical photoinitiator. When the composition includes cationic initiated epoxy monomer(s), the formulation will also contain at least one cationic photoinitiator. The photoinitiator will be present in amounts sufficient to initiate and sustain the curing of the composition, i.e., an initiating amount. Photoinitiators are typically used in the least amount necessary to obtain initiation of the curing process. Generally, the photoinitiator(s) is present in amounts of from 0.1 to 10 weight percent. In alternate embodiments, the photoinitiator is present in amounts of from 0.5 to 6 weight percent, e.g., from 1 to 4 weight percent, based on the total weight of the photoinitiated polymerizable components in the curable composition. Free radical photoinitiators are well known to those skilled in the art. Examples of commercial photoinitiators can be found in column 10, lines 38-43 of U.S. Pat. No. 5,910,375, which disclosure is hereby incorporated herein by reference.

Cationic photoinitiators can be used in conjunction with the free-radical photoinitiators. Generally, cationic initiators are used with abstraction type photoinitiators, hydrogen donor materials such as butyryl choline triphenylbutyl borate or combinations of such materials. Typical cationic photoinitiators are onium salts, which are described in U.S. Pat. No. 5,639,802, column 8, line 59 to column 10, line 46, which disclosure is hereby incorporated herein by reference. Non-limiting examples of such initiators include 4,4'-dimethyl-diphenyliodonium tetrafluoroborate, phenyl-4-octyloxyphenyl phenyliodonium hexafluoroantimonate, dodecyidiphenyl iodonium hexafluoroantimonate, [4-[(2-tetradecanol)oxy]phenyl]phenyl iodonium hexafluoroantimonate, triaryl sulfonium hexafluoroantimonate salts and triaryl sulfonium hexafluorophosphate salts, e.g., triphenylsulfonium salt of phosphorous hexafluoride. Mixtures of cationic initiators can also be used.

The resinous material of i) may also comprise oligomers and/or polymers, selected from acrylic polymers, polyesters, polyurethanes, polycarbonates, and polyethers. Generally these oligomers and polymers can be any of these types made by any method known to those skilled in the art. The functional groups on the resinous material may be selected from, inter alia, carboxylic acid groups, amine groups, epoxide groups, hydroxyl groups, thiol groups, carbamate groups, amide groups, urea groups, acrylate groups and mercaptan groups.

Suitable acrylic polymers include copolymers of acrylic acid or methacrylic acid, and/or one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include those mentioned above. The acrylic polymer can also be prepared with N-(alkoxymethyl) acrylamides and N-(alkoxymethyl)methacrylamides.

Carbamate functional groups can be included in the acrylic polymer by copolymerizing the acrylic monomers with a carbamate functional vinyl monomer, such as a carbamate functional alkyl ester of methacrylic acid. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the resinous material of i) may be an alkyd resin or a polyester oligomer and/or polymer. Such materials may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Unsaturated polyester resins are well known to those skilled in the art and can be prepared by the reaction of one or more polyols with one or more polycarboxylic acids (saturated and unsaturated), with olefinic unsaturation being provided by one or more of the reactants, usually the polycarboxylic acid. The polyester resin will generally have a number average molecular weight of from 1000 to 5000.

Non-limiting examples of unsaturated polycarboxylic acids, e.g., dicarboxylic acids, include but are not limited to, maleic, fumaric, citraconic, itaconic and meconic acids, their anhydrides and their lower alkyl esters or acid halides. Non-limiting examples of saturated polycarboxylic acids include aliphatic dicarboxylic acids such as malonic, succinic, glutaric, adipic, suberic, azelaic, pimelic and sebacic acids; aromatic acids such as orthophthalic, terephthalic, isophthalic acids and the anhydrides of such aromatic acids, such as phthalic anhydride and maleic anhydride, and the lower alkyl esters or acid halides of these acids or mixtures thereof.

Non-limiting examples of polyols include ethylene glycol, propylene glycol, butylene glycols, neopentyl glycol, dipropylene glycol and the poly(ethylene glycol)s, such as diethylene glycol, triethylene glycol, tetraethylene glycol and mixtures thereof.

The polyester resin may also contain other copolymerizable monomers such as allylic esters, acrylate monomers and mixtures thereof. Non-limiting examples of allylic esters include diallyl phthalate, diethylene glycol bis(allyl carbonate), triallyl cyanurate, allyl acrylate and diallyl maleate. Non-limiting examples of acrylate monomers include monoacrylates, diacrylates, triacrylates, tetraacrylates, pentaacrylates and higher polyfunctional acrylates, which include methyl methacrylate, ethylene glycol diacrylate, ethylene glycol dimethacrylate, polyethylene glycol diacrylate, polyethylene glycol dimethacrylate, 1,6-hexanedioldiacrylate, ethoxylated bisphenol A diacrylate, ethoxylated bisphenol A dimethacrylate, trimethylolpropane polyoxyethylene triacrylate, dipentaerythritol pentaacrylate and bis(4-methacrylolylthiophenyl)sulfide.

The allylic ester may represent from 1 to 20 weight percent of the polyester resin composition. The acrylate monomer may represent from 1 to 50 weight percent of the polyester composition. The polyester composition can be cured by incorporating conventional photoinitiators in the composition, followed by irradiating the composition with radiation, e.g., ultraviolet light. Non-limiting examples of polyester compositions can be found in Tables 2, 3, 5, 7 and 8 of U.S. Pat. No. 6,863,848, which compositions are incorporated herein by reference. Further details of these compositions and their curing can be found in column 16, line 11 through column 21, line 48 of U.S. Pat. No. 6,863,848 B2, which disclosure is incorporated herein by reference.

Another non-limiting example of a suitable resinous material of i) is a composition comprising an unsaturated polyester resin, an ethylenically unsaturated ester monomer, an optional vinyl monomer and a free radical polymerization catalyst. Such compositions are described in column 6, line 61 to column 10, line 54 of U.S. Pat. No. 5,319,007, which disclosure is incorporated by reference. The unsaturated polyester resin is derived from the interaction of saturated or unsaturated dicarboxylic acids with polyhydric alcohols.

The base polyester resin generally has a molecular weight of from 1500 to 5200 with an average molecular weight of 2470 and a Brookfield viscosity at 25° C. of 440 centipoises. In addition to the base polyester, a flexible polyester can be included optionally.

The ethylenically unsaturated ester can be an aromatic ester represented by the following general formula:

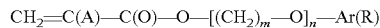

$$CH_2=C(A)-C(O)-O-[(CH_2)_m-O]_n-Ar(R)$$

wherein A comprises a $C_{1-12}$ alkyl, Ar comprises a phenylene molecule, R comprises a $C_{1-5}$ alkyl, m comprises an integer of 1 to 6, and n comprises an integer of 1 to 12, or the unsaturated ester can be an ester of an acrylic or methacrylic acid. Non-limiting examples of such ethylenically unsaturated esters include methyl acrylate, methyl methacrylate, phenoxyethyl acrylate, phenoxyethyl methacrylate, methoxyethyl methacrylate, methoxyethyl acrylate, ethoxyethyl methacrylate, and ethoxyethyl acrylate.

Carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as ethylenic unsaturation, amine, amide, thiol, and urea may be incorporated into the polyester or alkyd resin as desired using suitably functional reactants if available, or conversion reactions as necessary to yield the desired functional groups. Such techniques are known to those skilled in the art.

Polyurethanes can also be used as the resinous material of i). Among the polyurethanes which can be used are polyurethane polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic polyisocyanate, which is typically used, or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as ethylenic unsaturation, amide, thiol, and urea may be incorporated into the polyurethane as desired using suitably functional reactants if available, or conversion reactions as necessary to yield the desired functional groups. Such techniques are known to those skilled in the art.

Suitable polycarbonates may be prepared by reacting phosgene or carbonate diesters with one or more polyols including any of those disclosed above in the preparation of the polyester, as known to those skilled in the art. Bisphenol A is used as the polyol in one embodiment of the present invention.

Hydroxyl functionality is often terminal to polycarbonates. The hydroxyl functional groups may be converted to other functional groups as desired.

Examples of polyether polyols are polyalkylene ether polyols which include those having the following structural formula:

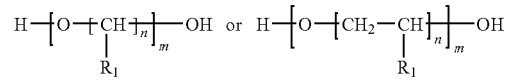

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene)glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E.I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

Appropriate mixtures of resinous materials may also be used in the invention. The amount of the resinous material in the curable film-forming composition generally ranges from 5 to 75 percent by weight based on the total weight of the curable film-forming composition.

The curable film-forming composition of b) used to prepare the optical element of the present invention further comprises ii) a curing (crosslinking) agent having reactive functional groups that are reactive with functional groups in the resinous material of i). The curing agent may comprise, for example, an aminoplast resin, a polyisocyanate, a blocked polyisocyanate, a polyepoxide, a polyacid, an anhydride, a polyanhydride, a polyamine, a polyethylenically unsaturated material such as a polyvinyl ether or poly(meth)acrylate, and/or a polyol.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®. Particularly useful aminoplasts include CYMEL® 385 (suitable for water-based compositions), CYMEL® 1158 imino-functional melamine formaldehyde condensates, and CYMEL® 303. Another useful crosslinking agent from Cytec Industries, Inc. that reacts in a manner similar to an aminoplast resin is Tris(alkoxycarbonylamino) Triazine sold under the tradename Cylink® 2000.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate which is utilized as a crosslinking agent can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be blocked or unblocked as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as diisopropylamine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexylmethyl)adipate. Higher molecular weight polyepoxides, including polyglycidyl ethers of polyhydric phenols and alcohols, are also suitable as crosslinking agents.

Polyacids, particularly polycarboxylic acids, are good curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used.

The above-described polyacid crosslinking agents are described in further detail in U.S. Pat. No. 4,681,811 at column 6, line 45 to column 9, line 54, which is incorporated herein by reference.

Polyethylenically unsaturated curing agents; i.e., materials having multiple ethylenically unsaturated groups, are particularly useful in film-forming compositions that cure using actinic radiation; e. g., UV curable compositions. Polyvinyl ethers, such as those available from Morflex, Inc., under the name Vectomer, are examples of suitable curing agents. Poly(meth)acrylate curing agents include ethylene glycol di(meth)acrylate, tetraethylene glycol di(meth)acrylate, glycerol di(meth)acrylate, glycerol tri(meth)acrylate, 1,3-propylene glycol di(meth)acrylate, dipropylene glycol di(meth)acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane di(meth)acrylate and trimethylolpropane tri(meth)acrylate.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene-diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Suitable polyol crosslinking agents include any polyols mentioned above.

Appropriate mixtures of curing agents may also be used in the invention. The amount of the curing agent in the curable film-forming composition generally ranges from 5 to 75 percent by weight based on the total weight of the curable film-forming composition.

The curable film-forming composition of b) further comprises iii) a material different from i) and ii), comprising a blocked isocyanate group and another different functional group capable of reacting with functional groups on the resinous material of i), functional groups on the curing agent of ii), functional groups on a superposed coating, and/or functional groups on the substrate. In one embodiment of the present invention, the isocyanate group is blocked with a blocking agent capable of deblocking at a temperature as low as 100° C., particularly useful when the film-forming composition is curable by actinic radiation. In a separate embodiment, such as when the film-forming composition is thermally curable, the blocking agent may be capable of deblocking at or below a temperature at which any of the functional groups, i.e., functional groups on the material of iii), functional groups on the resinous material of i), functional groups on the curing agent of ii), functional groups on a superposed coating, and/or functional groups on the substrate, react w/each other. Though not intending to be bound by theory, it is intended in any embodiment that free isocyanate groups on the material of iii) may be available to react with groups on the resinous material of i), groups on the curing agent of ii), groups on a superposed coating, and/or groups on the substrate, regardless of the method of cure. Such free isocyanate groups on the material of iii) may be available to react during the curing reaction of the resinous material of i) and the curing agent of ii) by deblocking at or below the curing temperature of the resinous material of i) and the curing agent of ii), while not adversely affecting the storage stability of the curable film-forming composition.

The blocking agent used in the material of iii) may be any blocking agent known to be capable of deblocking at a temperature as low as 100° C., or capable of deblocking at or below a temperature at which any of the functional groups in the film-forming composition react w/each other. Such deblocking may be enabled or enhanced by the use of known catalysts. The catalyst may comprise Lewis bases, Lewis acids and/or insertion catalysts described in Ullmann's Encyclopedia of Industrial Chemistry, 5th Edition, 1992, Volume A21, pp. 673 to 674, which description is herein incorporated by reference. For example, the catalyst may comprise tin octylate, dibutyltin diacetate, dibutyltin dilaurate, dibutyltin mercaptide, dibutyltin dimaleate, dimethyltin diacetate, dimethyltin dilaurate, dimethyltin mercaptide, dimethyltin dimaleate, triphenyltin acetate, triphenyltin hydroxide, 1,4-diazabicyclo[2.2.2]octane, and/or triethylamine. Triorganotin materials such as those disclosed in U.S. Pat. No. 5,902,871, col. 4, line 32 to col. 8, line 7, and U.S. Pat. No. 5,880,178, col. 4, line 15 to col. 8, line 18, incorporated herein by reference, may be used. Bismuth catalysts as known in the art may also be used. Examples of blocking agents that may be used are phenols (e.g. phenol, nonylphenol, cresol), oximes (e.g. butanone oxime, cyclohexanone oxime), lactams (e.g. ∈-caprolactam), secondary amines (e.g. diisopropyl-amine) and pyrazoles (e.g. dimethylpyrazole), imidazoles, triazoles). Suitable examples of blocking agents most often used include 3,5-dimethylpyrazole and N-t-butylbenzyl amine. Mixtures of blocking agents may also be used.

As noted above, the material of iii) further comprises at least one other different functional group capable of reacting with groups on the resinous material of i), groups on the curing agent of ii), groups on a superposed coating, and/or groups on the substrate. The functional groups may be any of those disclosed above in association with the resinous material or the curing agent. Alternatively, in certain embodiments, the functional group on the material of iii) comprises (meth)acryloyl, vinyl, allyl, maleinimido, trialkoxysilyl and/or haloalkyl.

In particular embodiments, the material of iii) comprises blocked trialkoxysilylpropyl isocyanates such as triethoxysilylpropyl isocyanate and/or trimethoxysilylpropyl isocyanate blocked with, most often, 3,5-dimethylpyrazole.

In a separate embodiment, the material of iii) may comprise a blocked isocyanatoalkyl(meth)acrylate such as isocyanatoethyl(meth)acrylate, most often blocked with 3,5-dimethylpyrazole. Isocyanatoethyl(meth)acrylate blocked with butanone oxime is also suitable and is available from Showa Denko K. K. as KarenzMOI-BM.

The material of iii) is present in the curable film-forming composition at least in an amount sufficient to improve adhesion between the curable film-forming composition and the substrate and/or a superposed coating compared to a similar optical element that does not contain (i. e., is substantially free of) the material of iii) in the curable film-forming composition. Adhesion may be measured by a standard method, for example, ASTM D-3359-93 (Standard Test Method for Measuring Adhesion by Tape Test-Method B). Typically, the material of iii) is present in the curable film-forming composition in an amount up to 20 percent by weight, often up to 10 percent by weight, based on the total weight of resin solids in the curable film-forming composition.

As discussed earlier, the optical element of the present invention is adapted to possess a light influencing property and may further comprise a material to provide a light influencing property. Such a material may be inorganic or organic and may be present in the substrate, curable film-forming composition and/or in a superposed coating or film as described below.

A wide variety of photochromic materials may be used in the optical article of the present invention to provide a light influencing property. The photochromic materials may be provided in a variety of forms. Examples include: a single photochromic compound; a mixture of photochromic compounds; a material containing a photochromic compound, such as a monomeric or polymeric ungelled solution; a material such as a monomer or polymer to which a photochromic compound is chemically bonded; a material comprising and/or having chemically bonded to it a photochromic compound, the outer surface of the material being encapsulated (encapsulation is a form of coating), for example with a polymeric resin or a protective coating such as a metal oxide that prevents contact of the photochromic material with external materials such as oxygen, moisture and/or chemicals that have a negative effect on the photochromic material; such materials can be formed into a particulate prior to applying the protective coating as described in U.S. Pat. Nos. 4,166,043 and 4,367,170; a photochromic polymer, e.g., a photochromic polymer comprising photochromic compounds bonded together; or mixtures thereof.

The inorganic photochromic material may contain crystallites of silver halide, cadmium halide and/or copper halide. Other inorganic photochromic materials may be prepared by the addition of europium (II) and/or cerium(III) to a mineral glass such as a soda-silica glass. In another embodiment, the inorganic photochromic materials are added to molten glass and formed into particles that are incorporated into the curable film-forming composition. Such inorganic photochromic materials are described in *Kirk Othmer Encyclopedia of Chemical Technology,* 4th Edition, Volume 6, pages 322-325.

The photochromic material may be an organic photochromic material having an activated absorption maxima in the range from 300 to 1000 nanometers. In one embodiment, the organic photochromic material comprises a mixture of (a) an organic photochromic material having a visible lambda max of from 400 to less than 550 nanometers, and (b) an organic photochromic material having a visible lambda max of from 550 to 700 nanometers.

The photochromic material may alternatively comprise an organic photochromic material that may be chosen from pyrans, oxazines, fulgides, fulgimides, diarylethenes and mixtures thereof.

Non-limiting examples of photochromic pyrans that may be used herein include benzopyrans, and naphthopyrans, e.g., naphtho[1,2-b]pyrans, naphtho[2,1-b]pyrans, indeno-fused naphthopyrans and heterocyclic-fused naphthopyrans, spiro-9-fluoreno[1,2-b]pyrans, phenanthropyrans, quinolinopyrans; fluoroanthenopyrans and spiropyrans, e.g., spiro(benzindoline)naphthopyrans, spiro(indoline)benzopyrans, spiro(indoline)naphthopyrans, spiro(indoline)quinolinopyrans and spiro(indoline)pyrans and mixtures thereof. Non-limiting examples of benzopyrans and naphthopyrans are disclosed in U.S. Pat. No. 5,645,767 at column 2, line 16 to column 12, line 57; U.S. Pat. No. 5,723,072 at column 2, line 27 to column 15, line 55; U.S. Pat. No. 5,698,141 at column 2, line 11 to column 19, line 45; U.S. Pat. No. 6,022,497 at column 2, line 21 to column 11, line 46; U.S. Pat. No. 6,080,338 at column 2, line 21 to column 14, line 43; U.S. Pat. No. 6,136,968 at column 2, line 43 to column 20, line 67; U.S. Pat. No. 6,153,126 at column 2, line 26 to column 8, line 60; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; U.S. Pat. No. 6,630,597 at column 2, line 16 to column 16, line 23; and U.S. Pat. No. 6,736,998 at column 2, line 53 to column 19, line 7 which disclosures are incorporated herein by reference. Further non-limiting examples of naphthopyrans and complementary organic photochromic substances are described in U.S. Pat. No. 5,658,501 at column 1, line 64 to column 13, line 17, which disclosure is incorporated herein by reference. Spiro(indoline) pyrans are also described in the text, *Techniques in Chemistry,* Volume III, "Photochromism", Chapter 3, Glenn H. Brown, Editor, John Wiley and Sons, Inc., New York, 1971.

Examples of photochromic oxazines that may be used include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, spiro(indoline)quinoxazine and mixtures thereof.

Examples of photochromic fulgides or fulgimides that may be used include: fulgides and fulgimides, which are disclosed in U.S. Pat. No. 4,685,783 at column 1, line 57 to column 5, line 27, and in U.S. Pat. No. 4,931,220 at column 1, line 39 through column 22, line 41, the disclosure of such fulgides and fulgimides are incorporated herein by reference. Non-limiting examples of diarylethenes are disclosed in U.S. Patent Application 2003/0174560 paragraphs [0025] to [0086].

Polymerizable organic photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymeric matrix compatibilized naphthopyran of U.S. Pat. No. 6,555,028 at column 2, line 40 to column 24, line 56 may be used. The disclosures of the aforementioned patents on polymerizable organic photochromic materials are incorporated herein by reference.

The photochromic materials can be incorporated, for example, into the curable film-forming composition by various means. The photochromic materials may be incorporated, e.g., dissolved and/or dispersed, into the composition, or polymerized with other components of the composition. Alternatively, the photochromic materials may be incorporated into the composition by imbibition, permeation or other transfer methods as known by those skilled in the art.

Typically the photochromic material is present in the optical element in a photochromic amount; that is, in an amount yielding a color change distinguishable by the naked eye upon exposure to radiation. In one embodiment, the amount of photochromic material incorporated into the curable film-forming composition may range from 0.5 to 40 weight percent based on the weight of the solids in the curable film-forming composition. In alternate embodiments, the amount of photochromic material ranges from 1 to 30 weight percent, from 3 to 20 weight percent, or from 3 to 10 weight percent.

The amount of photochromic material in the curable film-forming composition may range between any combination of these values, inclusive of the recited range.

Adjuvant materials may also be incorporated into the curable film-forming composition. Such adjuvants may be incorporated prior to, simultaneously with or subsequent to application or incorporation of any photochromic material. For example, ultraviolet light absorbers may be admixed with photochromic materials before their addition to the composition or such absorbers may be superposed, e.g., superimposed, as a coating or film between the curable film-forming composition and the incident light. However, caution should be exercised that the ultraviolet light absorbers are not used in such amounts as to interfere with the performance of the photochromic material, if present.

In addition to ultraviolet light stabilizers, other adjuvants such as stabilizers may be used to improve the light fatigue resistance of photochromic materials. Non-limiting examples of stabilizers include hindered amine light stabilizers (HALS), asymmetric diaryloxalamide(oxanilides) compounds and singlet oxygen quenchers, e.g., a nickel ion complex with an organic ligand, polyphenolic antioxidants and mixtures of such stabilizers are contemplated. The adjuvants may be used in the photochromic adhesive individually or as a mixture, e.g., of stabilizers in combination with ultraviolet light absorbers, as known to those skilled in the art.

Further adjuvant materials can be incorporated into the curable film-forming composition used in the optical element of the present invention, e.g., conventional ingredients that aid in processing or impart desired characteristics to the resulting optical elements. Non-limiting examples of such ingredients include solvents, e.g., aqueous and/or organic solvents, rheology control agents, surfactants, initiators, catalysts, cure-inhibiting agents, reducing agents, acids, bases, preservatives, free radical donors, free radical scavengers and thermal stabilizers, which adjuvant materials are known to those skilled in the art.

The optical element of the present invention may further comprise c) an at least partial film or coating superposed on the curable film-forming composition of b) and different therefrom. Such a coating or film may comprise, inter alia, a photochromic coating, tint coating, polarizing coating, and/or an abrasion resistant or other protective coating. Any of the coatings discussed earlier as applied directly to the substrate may additionally or alternatively be used as the superposed coating c). Likewise, any coatings discussed here below as the superposed coating c) may additionally or alternatively be applied directly to the substrate.

The types of material used for the film or coating may vary widely and be chosen from the polymeric organic materials of the substrate and the protective films described hereinafter. The thickness of the films of polymeric organic materials may vary widely. The thickness may range, for example, from 0.1 mil to 40 mils and any range of thicknesses between these values, inclusive of the recited values. However, if desired, greater thicknesses may be used.

The polymeric organic materials may be chosen from thermosetting materials, thermoplastic materials and mixtures thereof. Such materials include the polymeric organic materials chosen for the substrate as well as protective films. Other examples of films of polymeric organic materials are disclosed in U.S. Patent Publication 2004/0096666 in paragraphs [0082] to [0098] which disclosure of such polymeric films is incorporated herein by reference.

In certain embodiments, the film or coating c) comprises thermoplastic polymeric organic materials chosen from nylon, poly(vinyl acetate), vinyl chloride-vinyl acetate copolymer, poly($C_1$-$C_8$ alkyl)acrylates, poly($C_1$-$C_8$ alkyl) methacrylates, styrene-butadiene copolymer resin, poly (urea-urethanes), polyurethanes, polyterephthalates, polycarbonates, polycarbonate-silicone copolymer and mixtures thereof.

Optionally, compatible (chemically and color-wise) fixed tint dyes may be added or applied to the substrate, curable film-forming composition, and/or superposed films to achieve a more aesthetic result, for medical reasons, or for reasons of fashion. For example, the dye may be selected to complement the color resulting from activated photochromic materials, e.g., to achieve a more neutral color or absorb a particular wavelength of incident light. In another embodiment, the dye may be selected to provide a desired hue to the host material when the photochromic materials are in an unactivated state.

In a further embodiment, the aforementioned fixed tint dyes may be associated with the protective films described hereinafter used with the optical elements of the present invention as known to those skilled in the art. See for example, U.S. Pat. No. 6,042,737 at column 4, line 43 to column 5, line 8, which disclosure related to tinting coated substrates is incorporated herein by reference.

Often, a protective film is typically applied to the substrate to prevent scratches from the effects of friction and abrasion. The protective film may also serve as the superposed film or coating c). The protective film connected to the optical element of the present invention, in a particular embodiment, is an at least partially abrasion resistant film. The phrase "an at least partially abrasion resistant film" refers to an at least partial film of an at least partially cured coating or sheet of a protective polymeric material that demonstrates a resistance to abrasion that is greater than the standard reference material, typically a plastic made of CR-39® monomer available from PPG Industries, Inc, as tested in a method comparable to ASTM F-735 Standard Test Method for Abrasion Resistance of Transparent Plastics and Coatings Using the Oscillating Sand Method.

The protective film may be chosen from protective sheet materials, protective gradient films (which also provide a gradient in hardness for the films between which they are interposed), protective coatings and combinations thereof. Protective coatings such as hardcoats may be applied onto the surface of the polymeric film, the substrate and/or any applied films, e.g., superjacent to protective transitional films.

When the protective film is chosen from protective sheet materials, it may be chosen from the protective polymeric sheet materials disclosed in paragraphs [0118] to [0126] of U.S. Patent Publication 2004/0096666.

The protective gradient films provide an at least partially abrasion resistant film and may be subsequently coated with another protective film. The protective gradient film may serve to protect the article during shipping or subsequent handling prior to the application of the additional protective film. After application of an additional protective film, the protective gradient film provides a gradient in hardness from one applied film to another. The hardness of such films may be determined by methods known to those skilled in the art. In another non-limiting embodiment, a protective film is superjacent to a protective gradient film. Non-limiting examples of protective films providing such gradient properties include the radiation cured (meth)acrylate-based coatings described in U.S. Patent Application Publication 2003/0165686 in paragraphs [0010] to [0023] and [0079] to [0173], incorporated herein by reference.

The protective films may also include protective coatings. Examples of protective coatings known in the art that provide abrasion and scratch resistance are chosen from polyfunctional acrylic hard coatings, melamine-based hard coatings, urethane-based hard coatings, alkyd-based coatings and organosilane type coatings. Non-limiting examples of such abrasion resistant coatings are disclosed in U.S. Patent Application 2004/0096666 in paragraphs [0128] to [0149], and in U.S. Patent Application 2004/0207809 in paragraphs [0205] to [0249], both disclosures incorporated herein by reference.

In one embodiment, the optical element of the present invention further comprises an at least partially polarizing surface treatment, coating, or film. The phrase "at least partially polarizing" means that from some to all of the vibrations of the electric field vector of lightwaves is confined to one direction or plane by the surface treatment. Such polarizing effects may be achieved by applying to the optical element a film having an aligned dichroic material to at least partially polarize transmitted radiation. In one non-limiting embodiment, a polymeric sheet is stretched to align the dichroic material applied to the polymeric sheet. In another non-limiting embodiment, a coating is cured in a directional fashion, e.g., using polarized ultraviolet radiation, to align the dichroic materials in the coating.

In another embodiment, the optical element further comprises an at least partially antireflective surface treatment. The phrase "an at least partially antireflective surface" treatment means that there is an at least partial improvement in the antireflective nature of the optical element to which it is applied. In non-limiting embodiments, there may be a reduction in the amount of glare reflected by the surface of the treated optical element and/or an increase in the percent transmittance through the treated optical element as compared to an untreated optical element.

In another non-limiting embodiment, an at least partially antireflective surface treatment, e.g., a monolayer or multilayer of metal oxides, metal fluorides, or other such materials, can be connected to the polymeric film surface of the optical elements, e.g., lenses, of the present invention through vacuum evaporation, sputtering, or some other method.

The optical element of the present invention may further comprise an at least partially hydrophobic surface treatment. The phrase "an at least partially hydrophobic surface" is a film that at least partially improves the water repellent nature of the substrate to which it is applied by reducing the amount of water from the surface that can adhere to the substrate as compared to an untreated substrate.

The optical elements of the present invention may be produced by a variety of methods. The optical element of the present invention may be prepared by applying the curable film-forming composition to the substrate, for example, using any of the methods used in coating technology. Non-limiting examples include spray coating, spin coating, spin and spray coating, spread coating, curtain coating, dip coating, casting-coating, roll-coating, reverse roll coating, transfer roll coating, kiss/squeeze coating, gravure roll coating, blade coating, knife coating, and rod/bar coating.

In one embodiment, when the optical element of the present invention further comprises a film or coating c) superposed on the curable film-forming composition of b), or when the optical element further comprises protective and/or other films, the curable film-forming composition of b) may be applied directly to the substrate, or may first be applied to the other film c) and the combination of the film-forming composition of b) and the additional film c) may be applied as a composite to the substrate, such as by lamination.

The optical elements of the present invention may alternatively be prepared by utilizing a mold of a chosen design as the front mold, the curable film-forming composition of b), and a preformed optical substrate i), e.g., a preformed lens substrate, having a generally convex front surface, a generally concave back surface and a predetermined lens correction (if any) at its optical center, as a back mold. The method of forming lenses as disclosed in U.S. Pat. No. 4,873,029 may also be used to form the optical elements of the present invention.

Following application of the curable film-forming composition to the surface of the substrate, any solvent used to prepare the curable film-forming composition may be evaporated. This may occur before, during and/or after applying any subsequent coatings. The curable film-forming composition may also be at least partially cured before, during and/or after applying any superposed films or coatings. This may be accomplished, for example, by exposing a UV-curable composition to ultraviolet radiation before, during and/or after the process of connecting the at least partial film to it.

Methods used for curing the curable film-forming composition include solvent evaporation, radical polymerization, thermal curing, photopolymerization or a combination thereof. Additional methods include irradiating the polymerizable material with infrared, ultraviolet, gamma or electron radiation so as to initiate the polymerization reaction of any polymerizable components, or to initiate crosslinking mechanisms. This may be followed by a heating step. If the temperature of the curing method does not at least achieve 100° C., a separate heating step to at least 100° C. may be performed to allow for deblocking of the isocyanate material of iii).

The present invention is more particularly described in the following examples that are intended as illustration only, since numerous modifications and variations therein will be apparent to those skilled in the art.

EXAMPLES

Examples 1 and 3 demonstrate preparation of adhesion promoters to be used in optical elements of the present invention. In Example 1, a triethoxysilylpropyl isocyanate blocked with 3,5-dimethylpyrazole (DMP) is prepared. Example 2 is a comparative example, illustrating the preparation of triethoxysilylpropyl isocyanate blocked with N-ethylaminoisobutyltrimethoxysilane. Example 3 illustrates the preparation of 3,5-dimethylpyrazole-blocked trimethoxysilylpropyl isocyanate.

Example 1

Triethoxysilylpropyl isocyanate (25 g, 0.1 moles) was weighed into 100 ml round bottom jacketed round bottom flask equipped with a refrigerated circulator, thermometer and magnetic stirrer. Ethyl acetate (25 grams) was weighed into the flask. 3,5-dimethylpyrazole (9.4 grams, 0.1 moles) was added to the stirring mixture in 5 separate additions. After each addition the temperature increased. The next addition was made once the temperature decreased to <25° C. The mixture was stirred for additional 24 hours after the final addition. The ethyl acetate was removed on a rotary evaporator to provide a clear viscous liquid. The absence of free isocyanate was confirmed by infrared spectroscopy. The blocked isocyanate chemical structure was confirmed by proton NMR.

Example 2 (Comparative)

The same procedure as in Example 1 was followed except that the liquid N-ethylaminoisobutyltrimethoxysilane (21.3 g) was added dropwise to the stirring at a rate such that the temperature remained at 28° C. Once the addition was complete the temperature was raised to 50° C. for 20 minutes then cooled to room temperature. The ethyl acetate was removed on a rotary evaporator to provide a clear viscous liquid that yellowed over time. The absence of free isocyanate was confirmed by infrared spectroscopy. The blocked isocyanate chemical structure was confirmed by proton NMR. The ratio of ethoxy protons to methoxy protons indicated some hydrolysis occurred.

Example 3

The same procedure as in Example 1 was used except that instead of stirring for 24 hours after the final DMP addition, the mixture was heated to 50° C. for 30 minutes. The ethyl acetate was removed on a rotary evaporator to provide a clear viscous liquid. The absence of free isocyanate was confirmed by infrared spectroscopy. The blocked isocyanate chemical structure was confirmed by proton NMR.

Example 4

In the following example, piano PDQ coated polycarbonate lenses obtained from Gentex Optics were used. The test lenses were treated with an oxygen plasma for 1 minute using a Plasmatech machine at a power setting of 100 Watts while introducing oxygen at a rate of 100 ml/min into the vacuum chamber of the Plasmatech machine. The lenses were then rinsed with deionized water and dried with air. A photochromic polyurethane coating composition was applied to the plasma treated lenses by spin coating and thermally cured. The components of the polyurethane composition and their amounts are tabulated in Table 1. The components of the polyurethane composition were mixed for 30 minutes at 60° C., followed by 30 minutes of mixing at ambient temperature prior to being applied to the lenses. The photochromic polyurethane coating was approximately 20 microns thick.

TABLE 1

Formulation

| Component | Amount, Grams |
|---|---|
| Desmodur PL 3175A (a) | 2.6 |
| Vestanat B 1358A (b) | 7.6 |
| PC 1122 (c) | 8.0 |
| HCS 6234 polyol (d) | 1.9 |
| Tinuvin 144 UV stabilizer (e) | 0.36 |
| A-187 (f) | 0.53 |
| N-methyl pyrrolidinone | 5.6 |
| Photochromic Material (g) | 0.58 |
| L-5340 surfactant (h) | 0.05 |
| Dibutyltin dilaurate | 0.16 |

(a) Methyl ethyl ketoxime blocked hexamethylene diisocyanate (Bayer)
(b) Methyl ethyl ketoxime blocked isophorone diisocyanate trimer (CreaNova, Inc.)
(c) Polyhexane carbonate diol (Stahl)
(d) Polyacrylate polyol (Composition D in Example 1 of U.S. Pat. No. 6,187,444 B1)
(e) Hindered amine light stabilizer (Ciba-Geigy)
(f) γ Glycidoxypropyl trimethoxysilane coupling agent (OSi)
(g) A mixture of naphthopyran photochromic materials in proportions designed to give a gray tint to the coating when activated by UV radiation.
(h) Surfactant (Niax)

Nine coating preparations (Examples 4A through 4G) were prepared using 10 grams each of the dendritic polyester acrylate PRO-6021 and 0.025 g (0.25 pph acrylate) of BAPO photoinitiator [bis(2,4,6-trimethylbenzoyl)phenyl phosphine oxide]. PRO-6021 dendritic polyester acrylate is reported by its supplier to be a 50/50 blend of neopentylglycol-2-propoxylated diacrylate and a dendritic polyester acrylate in which approximately 13 of the 16 terminal hydroxy groups have been acrylated. The materials shown in Table 1 were added to eight of the nine coating preparations at 2.5 pph acrylate and/or 5.0 pph acrylate levels.

| EXAMPLE | ADHESION PROMOTER |
|---|---|
| 4A (Control) | None; control |
| 4B (Comparative) | N-methylaminopropyltrimethoxysilane |
| 4C | Aliphatic polyisocyanates based on IPDI (isophorone diisocyanate) (Desmodur PL-340, available from Bayer Corp) blocked with 3,5-dimethylpyrazole |
| 4D (Comparative) | glycidoxypropyl trimethoxysilane |
| 4E | Blocked 3-triethoxysilylpropyl isocyanate of Example 1 |
| 4F (Comparative) | Blocked 3-triethoxysilylpropyl isocyanate of Example 2 |
| 4G | Blocked 3-trimethoxysilylpropyl isocyanate of Example 3 |

The photochromic polyurethane coating on the test lenses were treated by plasma discharge using the Plasmatech machine using the same conditions used to treat the uncoated piano lenses. The dendritic polyester acrylate coating preparations were applied to the test lenses by spin coating to give a wet film weight of approximately 0.06 grams (approximately 10 microns thickness). The coatings were cured in a nitrogen atmosphere with UV light from a D bulb. Half of the lenses were tested for AB coating adhesion to the hardcoated polycarbonate lenses using the crosshatch peel test.

The other half of the test lenses there were treated with an oxygen plasma for 1 minute using a Plasmatech machine at a power setting of 100 Watts while introducing oxygen at a rate of 100 ml/min into the vacuum chamber of the Plasmatech machine. A non-tintable abrasion resistant coating composition, Table 2, was applied onto the lenses and the samples cured for 3 hours at 100° C. in a convection oven.

TABLE 2

Abrasion resistant coating composition

| | |
|---|---|
| glycidoxypropyl trimethoxysilane | 32.4 grams |
| methyltrimethoxysilane | 345.5 grams |
| Deionized water | 291.5 grams |
| Nitric acid (70% in water) | <1 drop |
| Dowanol PM (Propylene glycol methyl ether, available from Dow Chemical Co.) | 114 grams |
| Dowanol PM acetate | 114 grams |
| tetramethylammonium hydroxide, 25% in methanol | 3.3 grams to pH 5.5 |
| Polydimethylsiloxane surfactant (BYK 306, available from BYK-Chemie USA) | 0.9 grams |

The hard coated lenses were tested for adhesion of the hard coat using the crosshatch peel test. All the adhesion results are shown in Table 3.

TABLE 3

Crosshatch peel adhesion test results

| | pph | Adhesion Loss | |
|---|---|---|---|
| Example | additive | Dry | Wet |
| 4A-AB | 0 | 0% | 30%-40% |
| 4A-HC | 0 | 0% | 30% |

TABLE 3-continued

Crosshatch peel adhesion test results

| | pph | Adhesion Loss | |
|---|---|---|---|
| Example | additive | Dry | Wet |
| 4B-AB | 2.5 | 0% | 0% |
| 4B-HC | 2.5 | 0% | 50% |
| 4B-AB | 5 | 0% | 0% |
| 4B-HC | 5 | 0% | 100% |
| 4B-AB | 10 | 0% | 0% |
| 4B-HC | 10 | 0% | 100% |
| 4C-AB | 5 | 0% | 0% |
| 4C-HC | 5 | 0% | 5-15% |
| 4C-AB | 10 | 0% | 0% |
| 4C-HC | 10 | 0% | 20-30% |
| 4D-AB | 2.5 | 0% | 5% |
| 4D-HC | 2.5 | 0% | 0% |
| 4D-AB | 5 | 0% | 0% |
| 4D-HC | 5 | 0% | 0% |
| 4E-AB | 2.5 | 0% | 0% |
| 4E-HC | 2.5 | 0% | 0% |
| 4E-AB | 5 | 0% | 0% |
| 4E-HC | 5 | 0% | 0% |
| 4F-AB | 2.5 | 0% | 10-15% |
| 4F-HC | 2.5 | 0% | 15-20% |
| 4F-AB | 5 | 0% | 5% |
| 4F-HC | 5 | 0% | 0% |
| 4G-AB | 2.5 | 0% | 0% |
| 4G-HC | 2.5 | 0% | 0% |
| 4G-AB | 5 | 0% | 0% |
| 4G-HC | 5 | 0% | 0% |

Example 5A

Hydrophilic Urethane Prepolymer

The following materials were added in the order described to a four-neck round bottom flask equipped with an electronic temperature probe, mechanical stirrer, condenser, and a heating mantle.

| Charge A | |
|---|---|
| Material | Weight in grams |
| N-methyl pyrrolidinone (NMP) | 138.9 |
| dimethylolpropionic acid (DMPA) | 134.1 |
| triphenyl phosphite | 1.1 |
| dibutyltin dilaurate | 1.1 |
| butylated hydroxytoluene | 1.1 |

| Charge B | |
|---|---|
| Material | Weight in grams |
| 2-(dicaprolactone)ethyl acrylate | 344.4 |

| Charge C | |
|---|---|
| Material | Weight in grams |
| methylene bis(4-cyclohexylisocyanate) | 524.0 |

| Charge D | |
|---|---|
| Material | Weight in grams |
| diethanolamine | 105.1 |
| propylene glycol monobutyl ether | 138.9 |

Charge A was stirred in the flask at a temperature of 100° C. until all solids were dissolved. Charge B was added and the mixture was reheated to 80° C. Charge C was added over a 15 minute period and the resulting mixture was held at 80° C. for 3 hours. Charge D was added and the mixture was cooled to room temperature. The final product was an extremely viscous clear yellow solution with an acid value of 38.9 and a percent solids of 82%. The acid value was measured by potentiometric titration with KOH. The percent solids was determined by adding a known amount of the material to an aluminum pan, adding additional water to dilute the material and more evenly distribute it over the pan. The pan was placed in an oven at 110° C. for 1 hour. The pan was then re-weighed and the percent solids were determined from the remaining mass (minus the pan) divided by the initial mass (minus the pan).

Example 5B

Photochromic Hydrophobic Urethane Prepolymer

The following materials were added in the order described to a four-neck round bottom flask equipped with an electronic temperature probe, mechanical stirrer, condenser, and a heating mantle.

| Material | Weight in grams |
|---|---|
| Charge A | |
| N-methyl pyrrolidinone | 72.1 |
| Photochromic A[1] | 67.3 |
| 2-(dicaprolactone)ethyl acrylate | 103.4 |
| dibutyltin dilaurate | 0.3 |
| butylated hydroxytoluene | 0.3 |
| Charge B | |
| 2-heptyl-3,4-bis(9-isocyanatononyl)-1-pentyl-cyclohexane[2] | 117.4 |

[1]Photochromic A is 3,3-di(4-methoxyphenyl)-6,11,13-trimethyl-13-(2-(2-(2-hydroxyethoxy)ethoxy)ethoxy)-3H,13H-indeno[2,1-f]naphtho[1,2-b]pyran.
[2]Diisocyanate available from Cognis Corporation.

Charge A was stirred in the flask and heated to a temperature of 90° C. Charge B was added over a 17 minute period and the mixture was held at 90° C. for 90 minutes and then cooled to room temperature. The final product was a dark purple liquid with a Brookfield viscosity of 1390 cps (spindle #3, 50 rpm, 25° C.).

Example 5C

Aqueous Dispersion of Photochromic Microparticles Formed from Examples 5A and 5B The following materials were added in the order described as follows.

Charge A

| Material | Weight in grams |
| --- | --- |
| water | 282.0 |
| dimethylethanolamine | 5.76 |
| propylene glycol monobutyl ether | 15.84 |
| IGEPAL ® CO-897[7] surfactant | 3.57 |
| EXAMPLE 5A | 90.0 |

Charge B

| Material | Weight in grams |
| --- | --- |
| 2-(dicaprolactone)ethyl acrylate | 9.6 |
| EXAMPLE 5B | 49.7 |
| dodecylbenzenesulfonic acid (70% in isopropanol) | 2.33 |
| dimethylethanolamine | 0.65 |

Charge C

| Material | Weight in grams |
| --- | --- |
| water | 2.0 |
| ferrous ammonium sulfate | 0.01 |
| t-butyl hydroperoxide | 0.16 |

Charge D

| Material | Weight in grams |
| --- | --- |
| water | 6.0 |
| sodium metabisulfite | 0.2 |

Charge E

| Material | Weight in grams |
| --- | --- |
| dimethylethanolamine | 0.24 |
| water | 0.48 |

(7) A non-ionic surfactant available from Rhodia.

A pre-emulsion was prepared by stirring Charge A in a glass beaker. Of the pre-emulsion, 132.37 g was recycled for 15 minutes through a Microfluidizer® M110T at 8000 psi and 28° C. while Charge B was added in order. The Microfluidizer® M110T is available from the Microfluidics™ division of MFIC Corporation, Newton, Mass. The resulting microemulsion was transferred to a fourneck round bottom flask equipped with an overhead stirrer, condenser, electronic temperature probe, and a nitrogen inlet. Charge C was added rapidly as a mixture and then Charge D was added as a mixture over a period of 30 minutes. The temperature rose from 30° C. to 33° C. as Charge D was added. Finally, Charge E was added to produce a milky purple dispersion with a pH of 8. The dispersion was 31% solids.

Example 6

Coating Compositions of Aqueous Dispersions of Photochromic Microparticles of Example 5C to Evaluate Different Alkoxy Silane Additives for Adhesion and Shelf-Life The base hydrosol formulation (A) was prepared as follows: 110 g of hydrosol particle [03-209-016] of Part I was combined with 36.25 g of Cymel 328 (available from Cytec Industries), 10.5 g of Kflex 320 and 12.3 g of 4.36% solution of Tinuvin-144 in NMP. All were added with stirring. The solution was stirred overnight prior to adding the adhesion promoters.

The following adhesion promoters (Examples 6-1 to 6-8) were combined with ≈14.8 grams of (A). Examples 6-5 and 6-6 were used in accordance with the present invention. All others were comparative.

6-1. 54 g A-187, glycidoxypropyltrimethoxysilane from OSI Specialty Chemicals.

6-2. 50 g Gelest SIG5839.0 (3-GLYCIDOXYPROPYL) TRIETHOXYSILANE 6-3. 1.03 g SIB1140.0 (Gelest) BIS(2-HYDROXYETHYL)-3-AMINOPROPYLTRIETHOXYSILANE, 62% in methanol 6-4. 0.65 g SIH6172.0 (Gelest) N-(HYDROXYETHYL)-N-METHYLAMINOPROPYLTRIMETHOXYSILANE 75% in methanol 6-5. 0.68 g DMP blocked isocyanatopropyltrimethoxysilane (Example 3)

6-6. 0.79 g DMP blocked isocyanatopropyltriethoxysilane (Example 1)

6-7. No adhesion promoter, but Cymel 328 was replaced with Cymel 385 in (A)

6-8. 0.54 g A-187, glycidoxypropyltrimethoxysilane from OSI Specialty Chemicals with Cymel 385.

PDQ coated Gentex polycarbonate piano lenses were corona treated for 4 seconds while spinning ~1 inch from the corona discharge. The spin speed was about 200 RPM.

The coating solutions were applied to the corona treated lenses for 3-5 seconds at 1200 RPM to achieve wet film weights of 0.18 to 0.22 g. 4 lenses for each solution were coated.

The cure cycle was 80° C. for 20-25 min., 120° C. for 1 hour. ½ of each coating type was allowed 3 additional hours post cure at 100° C.

The adhesion test was as follows: A dry cross-hatch with 2 tape pulls (Scotch tape, 600) was performed prior to any further lens treatment and the primary adhesion was recorded. The lenses were then boiled in de-ionized water for 30 minutes. After cooling to room temperature, the cross-hatch and tape pull test was repeated, recording the results. No loss of primary adhesion was observed in any of the samples in the initial (dry) test. The data in the table only shows the secondary adhesion loss results. Table 4 below shows the results with the blocked isocyanate adhesion promoters relative to other silane coupling agents.

TABLE 4

| Example | Cure Cycle | Lens # | Adhesion % Loss |
|---------|------------|--------|-----------------|
| 6-1 | 120-1 hr | L1 | 0 |
| 6-1 | 120-1 hr | L2 | 0 |
| 6-1 | 120-1 hr + 100 3 hr | L1 | 0 |
| 6-1 | 120-1 hr + 100 3 hr | L2 | 0 |
| 6-2 | 120-1 hr | L1 | 20 |
| 6-2 | 120-1 hr | L2 | 25 |
| 6-2 | 120-1 hr + 100 3 hr | L1 | 95 |
| 6-2 | 120-1 hr + 100 3 hr | L2 | 85 |
| 6-3 | 120-1 hr | L1 | 20 |
| 6-3 | 120-1 hr | L2 | 30 |
| 6-3 | 120-1 hr + 100 3 hr | L1 | 99 |
| 6-3 | 120-1 hr + 100 3 hr | L2 | 60 |
| 6-4 | 120-1 hr | L1 | 95 |
| 6-4 | 120-1 hr | L2 | 60 |
| 6-4 | 120-1 hr + 100 3 hr | L1 | 5 |
| 6-4 | 120-1 hr + 100 3 hr | L2 | 5 |
| 6-5 | 120-1 hr | L1 | 0 |
| 6-5 | 120-1 hr | L2 | 0 |
| 6-5 | 120-1 hr + 100 3 hr | L1 | 0 |
| 6-5 | 120-1 hr + 100 3 hr | L2 | 0 |
| 6-6 | 120-1 hr | L1 | 40 |
| 6-6 | 120-1 hr | L2 | 30 |
| 6-6 | 120-1 hr + 100 3 hr | L1 | 80 |
| 6-6 | 120-1 hr + 100 3 hr | L2 | 90 |
| 6-7 | 120-1 hr | L1 | 100 |
| 6-7 | 120-1 hr | L2 | 100 |
| 6-7 | 120-1 hr + 100 3 hr | L1 | 100 |
| 6-7 | 120-1 hr + 100 3 hr | L2 | 100 |
| 6-8 | 120-1 hr | L1 | 0 |
| 6-8 | 120-1 hr | L2 | 0 |
| 6-8 | 120-1 hr + 100 3 hr | L1 | 0 |
| 6-8 | 120-1 hr + 100 3 hr | L2 | 0 |

Shelf-Life Tests

The coating solutions above were monitored over time to determine the shelf-life of these solutions. Only the solutions containing silane coupling agents that provided 0% adhesion loss (Examples 6-1, 6-5, and 6-8) were monitored. Examples 6-1 and 6-8 typically gelled in 2-3 days. Example 6-5 did not exhibit unacceptable viscosity increase until 2-3 weeks.

Whereas particular embodiments of this invention have been described above for purposes of illustration, it will be evident to those skilled in the art that numerous variations of the details of the present invention may be made without departing from the invention as defined in the appended claims.

What is claimed is:

1. An optical element adapted to possess a light influencing property, comprising:
   a) a substrate; and
   b) a curable film-forming composition applied to at least a portion of the substrate to form a coating thereon, wherein the curable film-forming composition comprises:
      i) a resinous material comprising a monomer, oligomer, and/or polymer containing reactive functional groups;
      ii) a curing agent having two or more reactive functional groups that are reactive with functional groups in the resinous material of i); and
      iii) a material different from i) and ii), comprising a blocked isocyanate group and another different functional group capable of reacting with functional groups on the resinous material of i), functional groups on the curing agent of ii), functional groups on a superposed coating, and/or functional groups on the substrate, wherein the different functional group on the material of iii) comprises trialkoxysilyl and
   wherein the isocyanate group is blocked with a blocking agent capable of deblocking at a temperature as low as 100° C. comprising 3,5-dimethylpyrazole and/or N-t-butylbenzyl amine, and wherein the material of iii) is present in the curable film-forming composition at least in an amount sufficient to improve adhesion between the curable film-forming composition and the substrate and/or a superposed coating compared to a substantially identical optical element that does not comprise the material of iii) in the curable film-forming composition.

2. The optical element of claim 1, wherein the material of iii) is present in the curable film-forming composition in an amount up to 20 percent by weight, based on the total weight of resin solids in the curable film-forming composition.

3. The optical element of claim 2, wherein the material of iii) is present in the curable film-forming composition in an amount up to 10 percent by weight, based on the total weight of resin solids in the curable film-forming composition.

4. The optical element of claim 1, further comprising a photochromic material comprising an inorganic photochromic material and/or an organic photochromic material.

5. The optical element of claim 4 wherein the photochromic material is an organic photochromic material comprising pyrans, oxazines, fulgides, fulgimides, and/or diarylethenes.

6. The optical element of claim 4, wherein the photochromic material is present in the curable film-forming composition.

7. The optical element of claim 1 wherein the substrate comprises mineral glass, ceramic material and/or polymeric organic material and is an ophthalmic article.

8. The optical element of claim 7 further comprising an at least partially antireflective surface treatment, an at least partially hydrophobic surface treatment or sequential surface treatments of antireflective and hydrophobic surface treatments directly applied on top of at least a portion of the substrate.

9. The optical element of claim 1, further comprising c) a film or coating superposed on the curable film-forming composition of b) and different therefrom.

10. The optical element of claim 9, wherein the superposed coating is an abrasion resistant coating.

11. The optical element of claim 1 further comprising protective films, at least partially polarizing surface treatments, coatings, or films, and/or combinations thereof, directly applied to at least a portion of the substrate.

12. The optical element of claim 1 wherein the substrate is adapted to possess a light influencing property.

13. The optical element of claim 12 wherein the substrate is adapted to possess photochromism.

14. The optical element of claim 12 wherein the light influencing property is integral to the substrate.

15. The optical element of claim 12 wherein a light influencing compound is contained in a coating or treatment applied to a surface of the substrate.

16. The optical element of claim 1, wherein the resinous material of i) comprises an acrylic polymer, a polyester polymer, a polyurethane polymer, a polycarbonate polymer, and/or a polyether polymer.

17. The optical element of claim 1, wherein the resinous material of i) comprises a (meth)acrylic monomer.

18. The optical element of claim 1, wherein the curing agent of ii) comprises an aminoplast resin, a polyisocyanate, a blocked polyisocyanate, a polyepoxide, a polyacid, an anhydride, a polyanhydride, a polyethylenically unsaturated material, and/or a polyol.

19. The optical element of claim 1, wherein the material of iii) comprises a trialkoxysilylpropyl isocyanate.

20. The optical element of claim 19, wherein the material of iii) comprises triethoxysilylpropyl isocyanate blocked with 3,5-dimethylpyrazole, and/or trimethoxysilylpropyl isocyanate blocked with 3,5-dimethylpyrazole.

21. An optical element adapted to possess a light influencing property, comprising:
   a) a substrate; and
   b) a curable film-forming composition applied to at least a portion of the substrate to form a coating thereon, wherein the curable film-forming composition comprises:
   i) a resinous material comprising a monomer, oligomer, and/or polymer containing reactive functional groups;
   ii) a curing agent having two or more reactive functional groups that are reactive with functional groups in the resinous material of i); and
   iii) a material different from i) and ii), comprising a blocked isocyanate group and another different functional group capable of reacting with functional groups on the resinous material of i), functional groups on the curing agent of ii), functional groups on a superposed coating, and/or functional groups on the substrate, wherein the different functional group on the material of iii) comprises trialkoxysilyl, and wherein the isocyanate group is blocked with a blocking agent capable of deblocking at or below a temperature at which any of the functional groups on the material of iii), functional groups on the resinous material of i), functional groups on the curing agent of ii), functional groups on a superposed coating, and/or functional groups on the substrate react w/each other, said blocking agent comprising 3,5-dimethylpyrazole and/or N-t-butylbenzyl amine, and wherein the material of iii) is present in the curable film-forming composition at least in an amount sufficient to improve adhesion between the curable film-forming composition and the substrate and/or a superposed coating compared to a substantially identical optical element that does not comprise the material of iii) in the curable film-forming composition.

* * * * *